(12) United States Patent
Olderdissen et al.

(10) Patent No.: US 10,360,044 B2
(45) Date of Patent: Jul. 23, 2019

(54) MASSIVELY PARALLEL AUTONOMOUS REIMAGING OF NODES IN A COMPUTING CLUSTER

(71) Applicant: Nutanix, Inc., San Jose, CA (US)

(72) Inventors: Jan Ralf Alexander Olderdissen, Herrenberg (DK); Miao Cui, New York, NY (US); Brian Andrew Griffiths Finn, Sunnyvale, CA (US); Mengyang Li, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/264,586

(22) Filed: Sep. 13, 2016

(65) Prior Publication Data

US 2019/0155613 A1    May 23, 2019

(51) Int. Cl.
| | |
|---|---|
| *G06F 9/00* | (2006.01) |
| *G06F 9/4401* | (2018.01) |
| *G06F 15/177* | (2006.01) |
| *G06F 21/53* | (2013.01) |
| *G06F 8/61* | (2018.01) |
| *G06F 3/06* | (2006.01) |
| *G06F 9/455* | (2018.01) |

(52) U.S. Cl.
CPC .......... *G06F 9/4416* (2013.01); *G06F 3/065* (2013.01); *G06F 3/0619* (2013.01); *G06F 3/0685* (2013.01); *G06F 8/63* (2013.01); *G06F 9/45558* (2013.01); *G06F 15/177* (2013.01); *G06F 21/53* (2013.01); *G06F 2009/45595* (2013.01)

(58) Field of Classification Search
CPC ....... G06F 9/4416; G06F 3/0619; G06F 3/065

USPC ............. 717/177, 168, 172; 711/153; 726/1
See application file for complete search history.

(56) References Cited

U.S. PATENT DOCUMENTS

| | | | | |
|---|---|---|---|---|
| 6,721,612 B2 * | 4/2004 | Aramaki | ................... | G06F 8/60 700/4 |
| 7,840,957 B2 * | 11/2010 | Kumashiro | ............... | G06F 8/65 717/168 |
| 8,549,518 B1 | 10/2013 | Aron et al. | | |
| 8,601,473 B1 | 12/2013 | Aron et al. | | |
| 8,850,130 B1 | 9/2014 | Aron et al. | | |

(Continued)

OTHER PUBLICATIONS

U.S. Appl. No. 15/178,504, filed Jun. 9, 2016, 59 pages.

(Continued)

*Primary Examiner* — Aurel Prifti
(74) *Attorney, Agent, or Firm* — Vista IP Law Group, LLP

(57) ABSTRACT

Systems for management of a large computing cluster. A set of computing nodes within the cluster are identified. The identified nodes are to be reimaged with an operating system image and parameters. One or more reimaging algorithms in the form of computer code are stored in a networked storage device within a storage pool that comprises the networked storage device and a plurality of local storage devices that correspond to respective individual ones of the set of computing nodes. An agent that can execute the reimaging algorithm code is configured to run on any one of the set of computing nodes, wherein the agent is further configured to retrieve reimaging data from a storage device that is within the storage pool. An agent running on a leader node initiates reimaging of a second node. The second node initiates reimaging of a third node. The third node reimages the leader node.

20 Claims, 16 Drawing Sheets

(56) References Cited

U.S. PATENT DOCUMENTS

| | | | |
|---|---|---|---|
| 9,141,376 B2* | 9/2015 | Furushige | G06F 8/658 |
| 9,298,443 B2* | 3/2016 | Dias de Assuncao | G06F 8/63 |
| 9,386,397 B2* | 7/2016 | Koganti | H04M 1/72525 |
| 9,600,262 B2* | 3/2017 | Assuncao | G06F 9/5055 |
| 9,684,504 B1* | 6/2017 | Giannini | G06F 8/65 |
| 9,772,866 B1 | 9/2017 | Aron et al. | |
| 2006/0123414 A1* | 6/2006 | Fors | G06F 8/61 |
| | | | 717/177 |
| 2006/0200703 A1* | 9/2006 | Mueller | G06F 11/1433 |
| | | | 714/38.13 |
| 2007/0261050 A1* | 11/2007 | Nakano | G06F 21/10 |
| | | | 717/172 |
| 2010/0064285 A1 | 3/2010 | Dechovich et al. | |
| 2010/0257346 A1 | 10/2010 | Sosnosky et al. | |
| 2012/0079474 A1* | 3/2012 | Gold | G06F 8/63 |
| | | | 717/173 |
| 2012/0110275 A1* | 5/2012 | Ganti | G06F 12/08 |
| | | | 711/153 |
| 2012/0227036 A1* | 9/2012 | Crk | G06F 8/658 |
| | | | 717/177 |
| 2012/0246457 A1 | 9/2012 | Sosnosky et al. | |
| 2012/0272320 A1 | 10/2012 | Rados et al. | |
| 2014/0020049 A1* | 1/2014 | Smith, III | G06F 21/121 |
| | | | 726/1 |
| 2014/0101430 A1 | 4/2014 | Bennah et al. | |
| 2016/0170788 A1* | 6/2016 | Tarasuk-Levin | G06F 9/45558 |
| | | | 718/1 |
| 2018/0032258 A1* | 2/2018 | Edwards | G06F 3/065 |

OTHER PUBLICATIONS

U.S. Appl. No. 15/230,147, filed Aug. 5, 2016, 57 pages.
International Search Report dated Nov. 16, 2017 for corresponding PCT Application No. PCT/US17/51422, 14 pages.
Pitras, Steven. "The Nutanix Bible" (Jun. 20, 2014), from http://stevenpoitras.com/the-nutanix-bible/ (Publication late based on indicated capture date by Archive.org; first publication date unknown).
Poitras, Steven. "The Nutanix Bible" (Jun. 9, 2015), from http://stevenpoitras.com/the-nutanix-bible/ (Publication late based on indicated capture date by Archive.org; first publication date unknown).
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

* cited by examiner

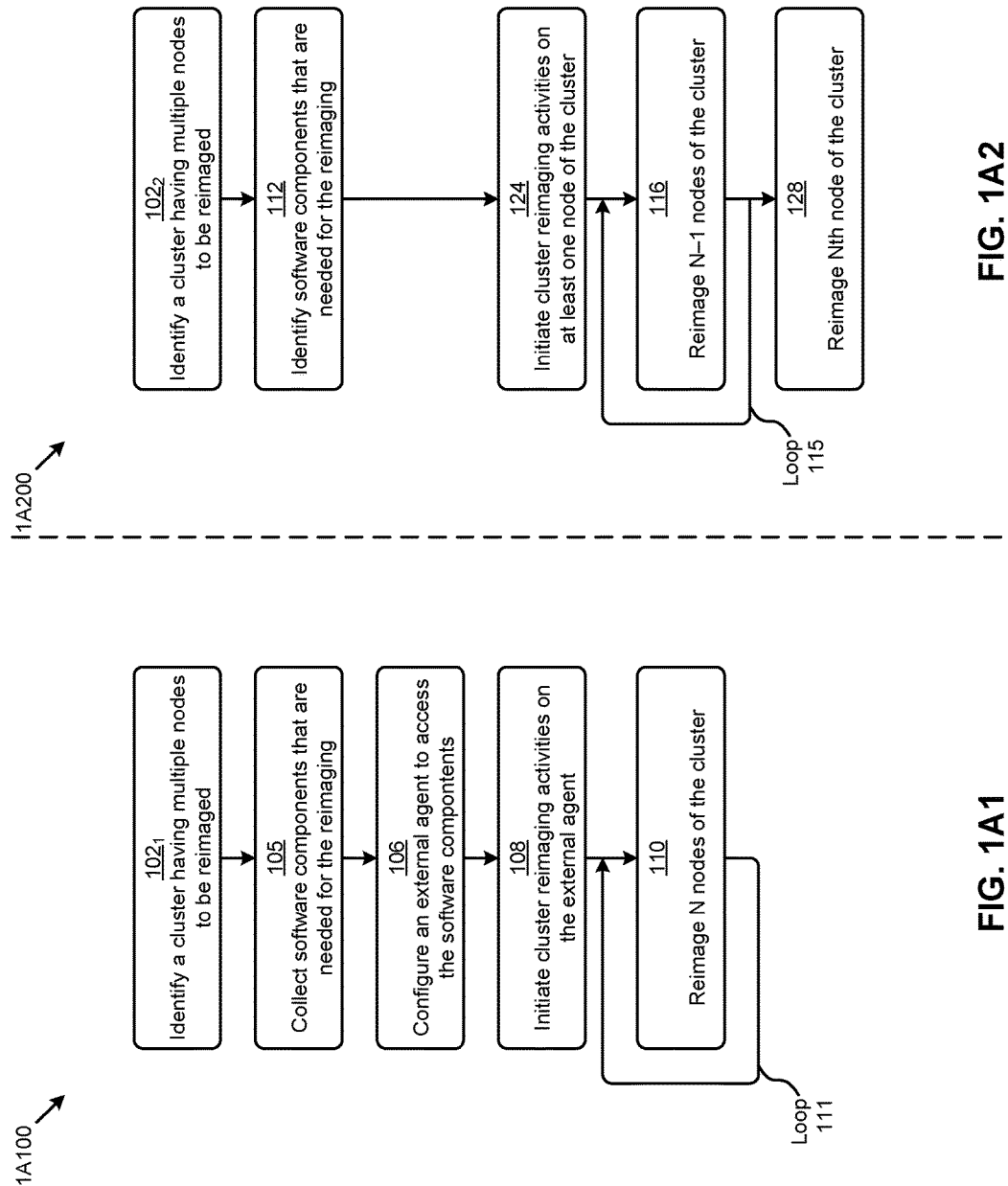

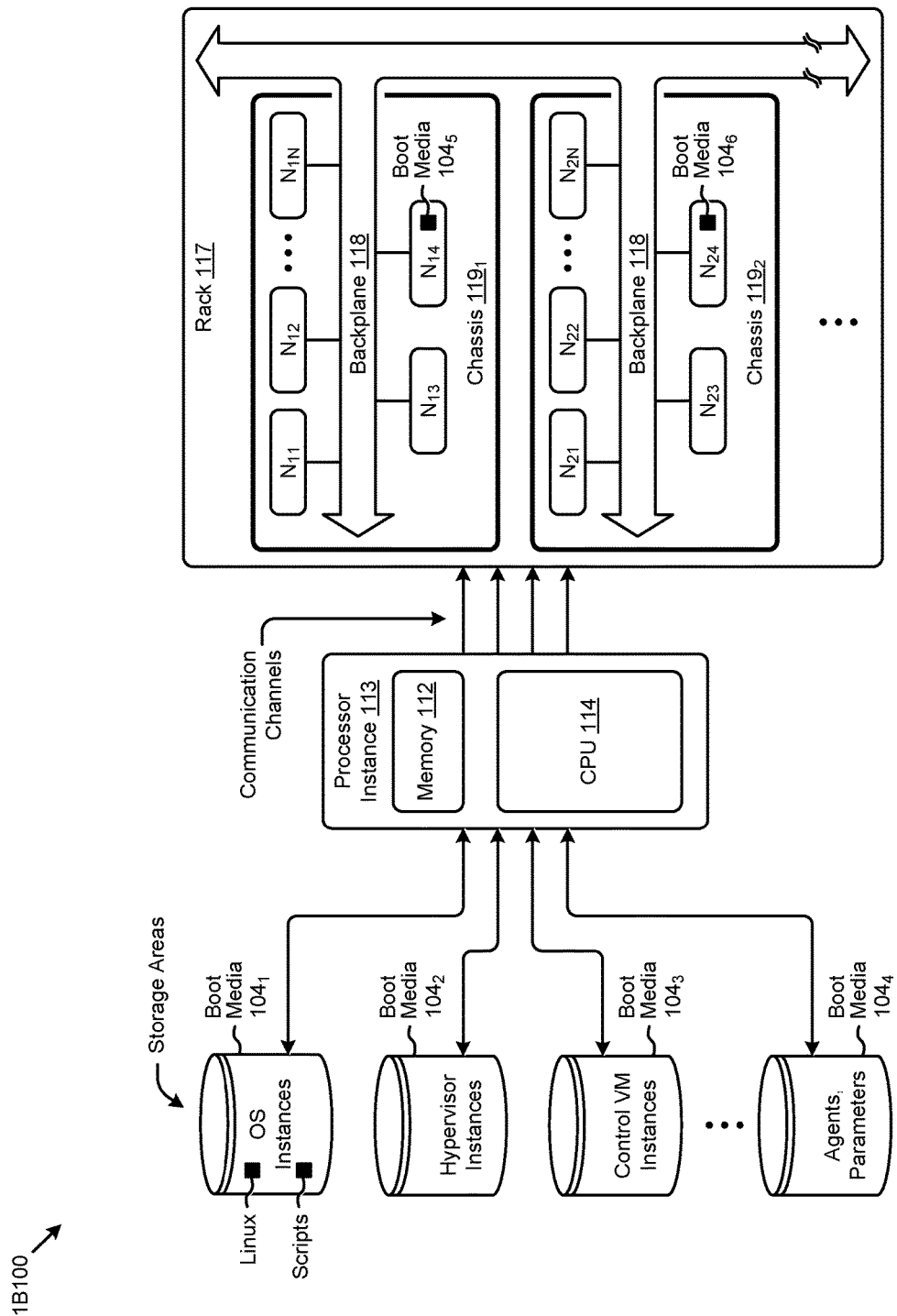
FIG. 1B1

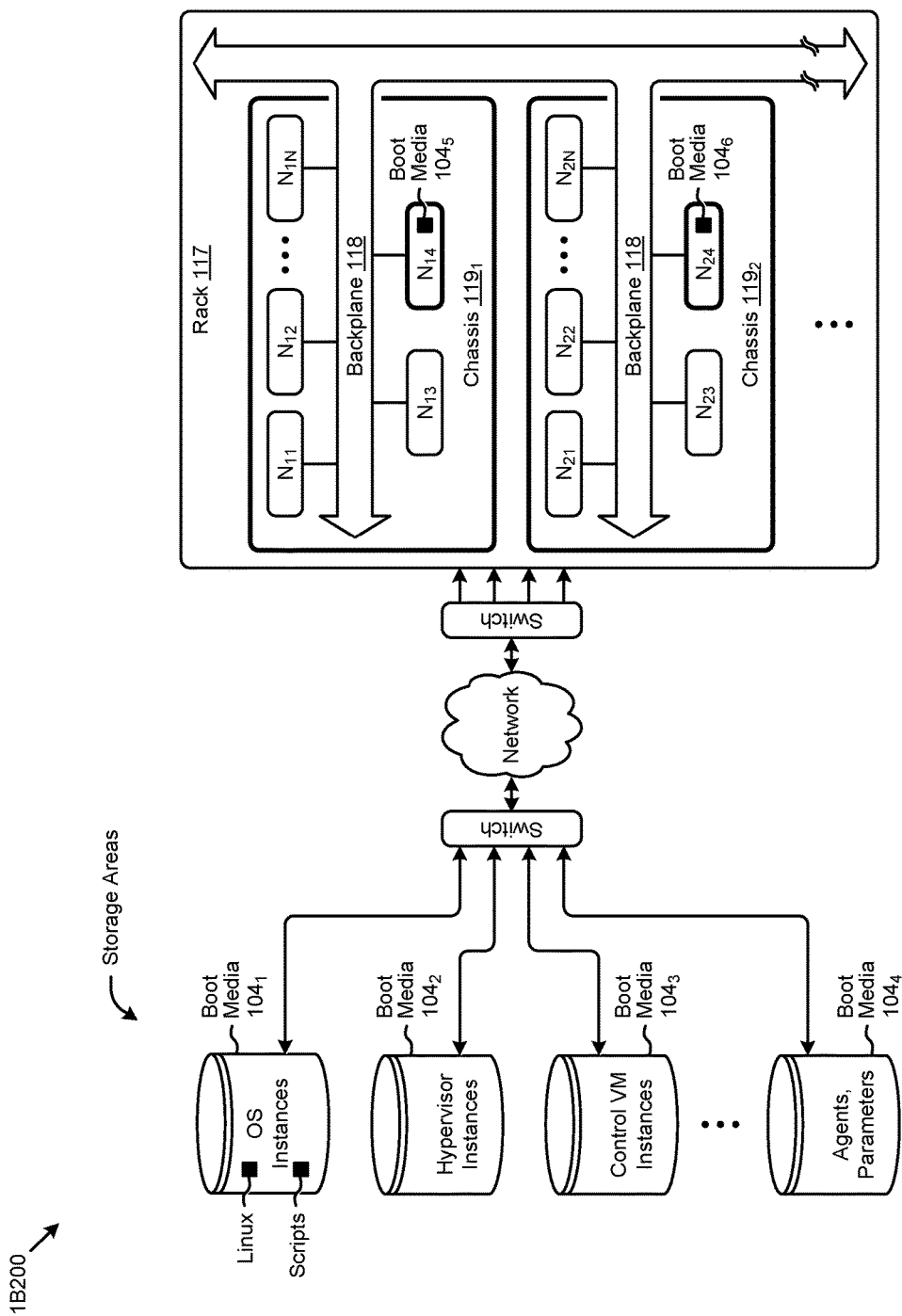
FIG. 1B2

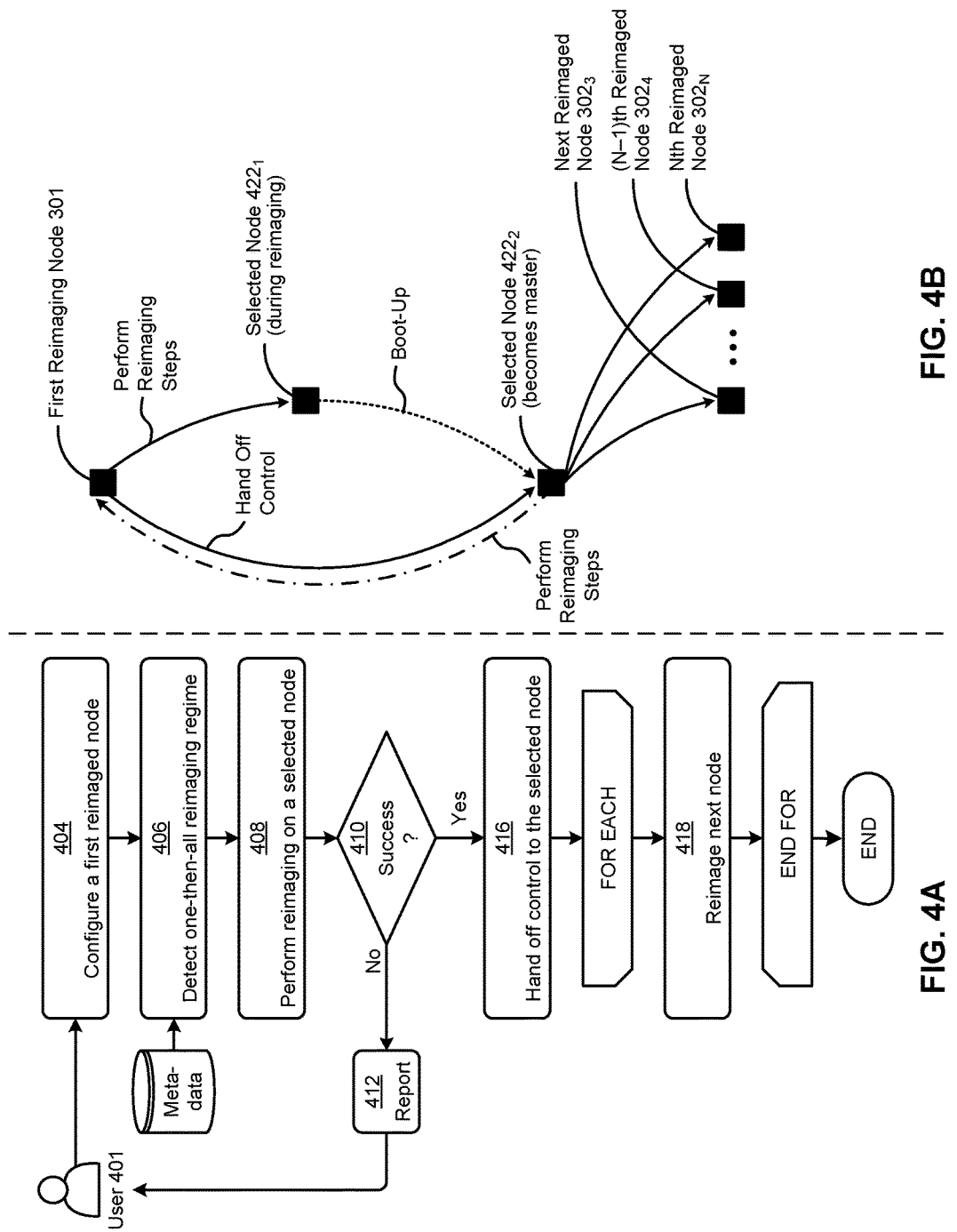

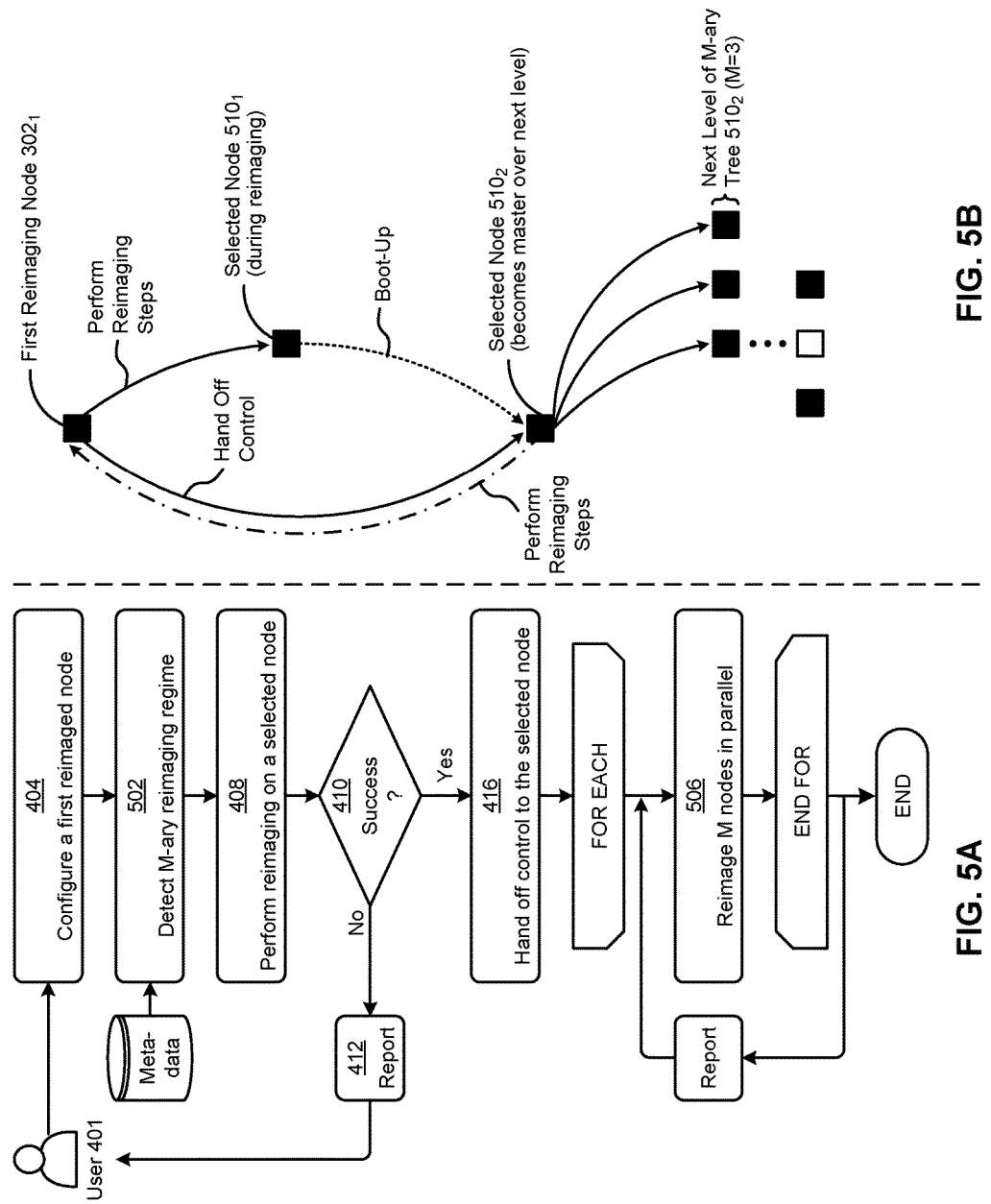

MASSIVELY PARALLEL AUTONOMOUS REIMAGING OF NODES IN A COMPUTING CLUSTER

FIELD

This disclosure relates to management of a large computing cluster, and more particularly to techniques for autonomous reimaging of nodes in a multi-node computing cluster.

BACKGROUND

Computing clusters can comprise many hundreds or thousands of nodes, where each node has its own dedicated local storage that contains an operating system image, application images, and configurations. From time to time it is desirable to reimage the operating system and/or portions of a software configuration to bring all nodes up to some consistent level of configuration. Unfortunately, legacy techniques often rely on a computing platform outside the cluster to facilitate reimaging, however as clusters become large and larger, use of such an external node can become "swamped" with work, and can introduce high latency between the time a reimaging procedure is initiated and the time it completes with all nodes being reimaged and restarted.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for autonomous reimaging of nodes in a multi-node computing cluster, which techniques advance the relevant technologies to address technological issues with legacy approaches. Certain embodiments are directed to technological solutions for exploit the parallelism of reimaging by using the many nodes of the cluster to reimage itself with software stored in a shared storage pool.

The disclosed embodiments modify and improve over legacy approaches. In particular, the herein-disclosed techniques provide technical solutions that address the technical problems attendant to use of external reimaging agents when reimaging nodes in a cluster fails in large cluster scenarios. Such technical solutions relate to improvements in computer functionality. Various applications of the herein-disclosed improvements in computer functionality serve to reduce the demand for network bandwidth use, and reduce the demand for extra-cluster component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing in a computing cluster as well as advances in various technical fields related to storage system management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A1 and FIG. 1A2 are flow charts for comparison between reimaging techniques.

FIG. 1B1 is a system diagram depicting an external agent reimaging technique.

FIG. 1B2 is a system diagram depicting an autonomous reimaging technique as used to implement autonomous reimaging of nodes in a multi-node computing cluster, according to some embodiments.

FIG. 4A and FIG. 4B depicts a two level test-then-go technique as used to implement autonomous reimaging of nodes, according to an embodiment.

FIG. 5A and FIG. 5B depicts a multi-level test-then-go technique as used to implement autonomous reimaging of nodes, according to an embodiment.

DETAILED DESCRIPTION

Figure 1C:
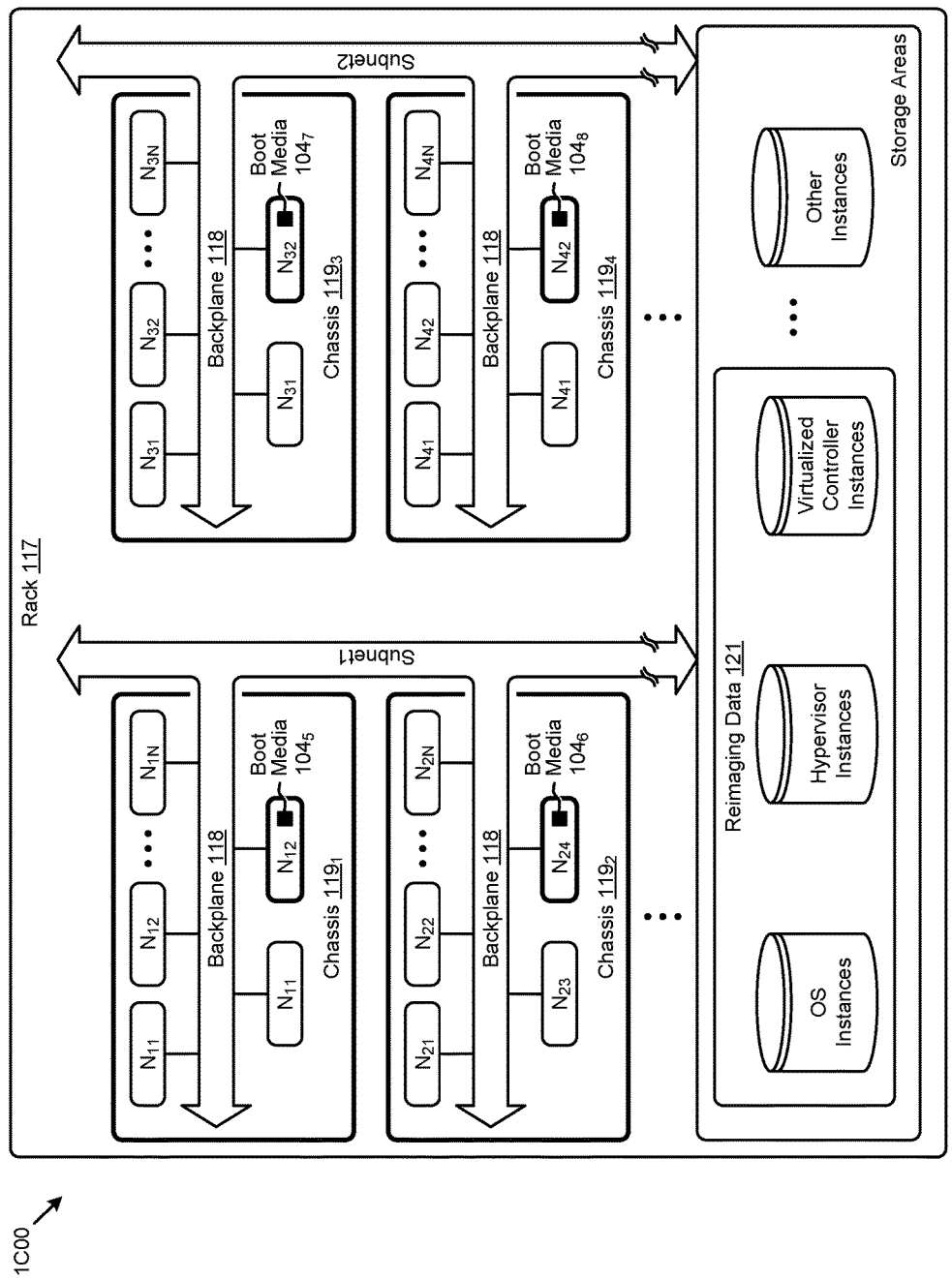
FIG. 1C is a system diagram depicting a multi-node computing cluster with a storage pool as used when implementing autonomous reimaging of nodes in a multi-node computing cluster, according to some embodiments.

Embodiments in accordance with the present disclosure address the problem of use of external reimaging agents when reimaging nodes in a cluster. Some embodiments are directed to approaches for exploit the parallelism of reimaging by using the many nodes of the cluster to reimage itself with software stored in a shared storage pool. The accompanying figures and discussions herein present example environments, systems, methods, and computer program products for autonomous reimaging of nodes in a multi-node computing cluster.

Overview

It is desirable to change the operating system and/or portions of a software stack in a hyperconverged cluster without using any agent outside that cluster. Using techniques as disclosed herein, the installation can be done in stages, many of which stages can perform reimaging of multiple nodes in parallel, where each of the multiple nodes read reimaging data (e.g., a new operating system image or an updated or patched operating system image, etc.) from a storage pool. Management through the progression of stages can be shared among the nodes in the cluster, using a relatively few nodes for some stages (e.g., to mitigate risk) and using many nodes of the cluster in parallel (e.g., when the risk has been assessed and/or mitigated). As disclosed herein a user images an "instance" of the software stack for loading onto one node (e.g., where the instance is configured with entirety of software packages to be installed, together with parameters for imaging). That node initiates imaging on other node or nodes in the cluster, deferring reimaging of itself until a later point in the cluster-wide reimaging installation procedure. When a first node is fully imaged, it is "sanity" tested to be sure the reimaging "takes". If so, that node can invoke and monitor reimaging on all other nodes. When all other nodes of the cluster are imaged, the first node is reimaged, thus completing the task of reimaging the entire cluster even without reliance on an external agent. There are many variations. For example, the first node may image all other nodes, and then designate one of the reimaged nodes to perform reimaging on the first node itself. For larger and larger clusters, and to make the process scalable, the installation may fan out in waves. For example, the first node will image a next node and hand off installation tasks to it. Then, that next node will image several other nodes in the cluster. After reimaging the several other nodes, each one of the reimaged several other nodes will image several more nodes, and so on until all nodes are imaged.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A1 and FIG. 1A2 are flow charts for comparison between reimaging techniques. As an option, one or more variations of reimaging techniques or any aspects thereof may be implemented in the context of the architecture and functionality of the embodiments described herein.

The embodiments shown in FIG. 1A1 and FIG. 1A2 are for comparisons between a reimaging technique that uses an external agent to reimage a cluster and a reimaging technique that is performed intra-cluster without use of an external agent. As shown in the examples of FIG. 1A1 and FIG. 1A2, the reimaging techniques commence upon identification of a cluster that is to be reimaged (e.g., step $102_1$ and step $102_2$). The external agent reimaging technique 1A100 continues to collect needed software components (step 105) which are then used to configure an external agent (step 106). The external agent is connected (e.g., through a LAN or other communication port) to the cluster, and the external agent initiates reimaging activities over nodes of the cluster (step 108). Further, and as shown, the external agent remains connected to the cluster and reimages N nodes of the cluster (step 110 and loop 111).

The intra-cluster reimaging technique 1A200 uses a node within the cluster to identify software components that are needed for reimaging (step $102_2$). In some cases, an administrator uses a node of the cluster to access software modules from outside the cluster (e.g., from a private code repository or from a community code repository). When the software modules needed for the reimaging are assembled (e.g., into a storage area accessible by the nodes of the cluster), one node of the cluster can be designated to initiate cluster reimaging activities (step 124). Such activities might include a progression of reimaging over many nodes of the cluster. In one case of a cluster composed of N nodes the Nth node is selected as the designate. The designated node initiates and/or performs reimaging over the remaining N−1 nodes (step 116 and loop 115). When N−1 nodes have been reimaged (e.g., all except the original designate on node N), then a different designate can be selected to initiate reimaging on the Nth node (step 128).

The foregoing steps can be administered over various configurations of clusters composed of multiple computing nodes. The following figures depict some such configurations. Specifically, FIG. 1B depicts a configuration with an external agent, and FIG. 1B2 depicts a configuration without an external agent.

FIG. 1B1 is a system diagram depicting an external agent reimaging technique 1B100. As an option, one or more variations of external agent reimaging technique 1B100 or any aspect thereof may be implemented in the context of the architecture and functionality of the embodiments described herein.

In one embodiment, a cluster of computing nodes can be organized into a cabinet (e.g., rack 117) that hosts a number of drawers (e.g., chassis $119_1$, chassis $119_2$, . . . etc.) that are interconnected by a backplane 118. Such a backplane might implement an Ethernet fabric, and/or a Fibre Channel backplane and/or any multi-point communication channel that facilitates communication between nodes. As shown, a drawer might be composed of some number of computing nodes. The shown example includes a first chassis $119_1$ composed of five nodes (e.g., $N_{11}$, $N_{12}$, $N_{13}$, $N_{14}$, . . . and $N_{1N}$) and a second chassis $119_2$ composed of another five nodes (e.g., $N_{21}$, $N_{22}$, $N_{23}$, $N_{24}$, . . . and $N_{2N}$).

In this configuration, nodes within the cluster can be accessed by an external agent (e.g., processor instance 113) composed of at least one CPU 114 and memory 112. One or more communication channels (e.g., Ethernet, serial I/O, IPMI, etc.) can be used by the external agent to move boot media from one or more storage areas to one or more nodes. As shown, the storage areas comprise boot media in various forms (e.g., boot media $104_1$, boot media $104_2$, boot media $104_3$, boot media $104_4$). More particularly, the boot media might comprise any configuration or combination of an OS instances, and hypervisor instances. In some situations, for example when a cluster implements all or portions of a distributed storage system, the storage areas might be populated with virtual machines that are preconfigured to facilitate aspects of running and managing the distributed storage system. Such virtual machines can run over a virtualizing layer (e.g., a hypervisor), or can run as a virtualized controller as a container (e.g., a Docker container). Moreover, such virtual machines or virtual controllers might be included in and/or comprise boot media. Boot media might include code for agents and/or configuration data that, for example, are used to configure devices prior to or during a boot cycle.

In a large cluster, an external might communicate with nodes of the cluster in a one-by-one fashion and might take advantage of as much I/O bandwidth as is available from the communication channels. In other situations, additional bandwidth between nodes and/or between any devices or facilities of the cluster can be provided by the aforementioned backplane. In such a case, when boot media is located on a node (e.g., boot media $104_5$ or boot media $104_6$) or is made accessible to the nodes (e.g., over a high-speed switch/network, and/or over the backplane 118), the movement of boot media bits can be accomplished much more rapidly than by using the communication channels to the external agent. A configuration such that boot media is made accessible to the nodes over the backplane 118, is shown and discussed as pertains to FIG. 1B2.

FIG. 1B2 is a system diagram depicting an autonomous reimaging technique 1B200 as used to implement autonomous reimaging of nodes in a multi-node computing cluster. As an option, one or more variations of autonomous reimaging technique 1B200 or any aspect thereof may be implemented in the context of the architecture and functionality of the embodiments described herein. The autonomous reimaging technique 1B200 or any aspect thereof may be implemented in any environment.

Any of the aforementioned storage areas can be amalgamated into a storage area, which can be made accessible to the nodes of the cluster through a network, possibly including one or more switches (e.g., IP switches) and/or routers.

A particular node or nodes can be initially designated (e.g., initially designated node $N_{14}$, and initially designated node $N_{24}$) to access the boot media stored in a location accessible to the node or nodes, as shown by the presence of boot media at the node (e.g., boot media $104_5$, and boot media $104_6$).

In some embodiments, the storage pool can be brought into the rack and connected to the backplane of the rack, thus facilitating high-speed network and storage I/O by and between any computing element connected to the backplane. One such embodiment is shown and discussed as pertains to FIG. 1C.

FIG. 1C is a system diagram depicting a multi-node computing cluster 1C00 with a storage area as used when implementing autonomous reimaging of nodes in a multi-node computing cluster. As an option, one or more variations of multi-node computing cluster 1C00 or any aspect thereof may be implemented in the context of the architecture and functionality of the embodiments described herein. The multi-node computing cluster 1C00 or any aspect thereof may be implemented in any environment.

The multi-node computing cluster 1C00 can take the form of a cabinet (e.g., rack 117), which in turn might comprise any number of drawers (e.g., chassis $119_1$, chassis $119_2$, chassis $119_3$, and chassis $119_4$). Communication between the nodes of the several chassis can be over the backplane, which might also interconnect with storage devices that are amalgamated into the storage area. Boot media (e.g., boot media $104_5$, boot media $104_6$, boot media $104_7$, boot media $104_8$) can be moved to a node by retrieval from the storage area. A node can be configured to execute a virtual machine or an executable container. Such a virtual machine or an executable container can include a reimager agent or other code that can retrieve any bits of stored information from the storage area, possibly including any boot media or reimaging data 121 such as is stored in the OS instances, the hypervisor instances, the virtualized controller instances and/or other instances. In the example shown in the following figures a set of virtualized controllers, each of which subsume or communicate with one or more reimager agent instances.

Figure 2A:
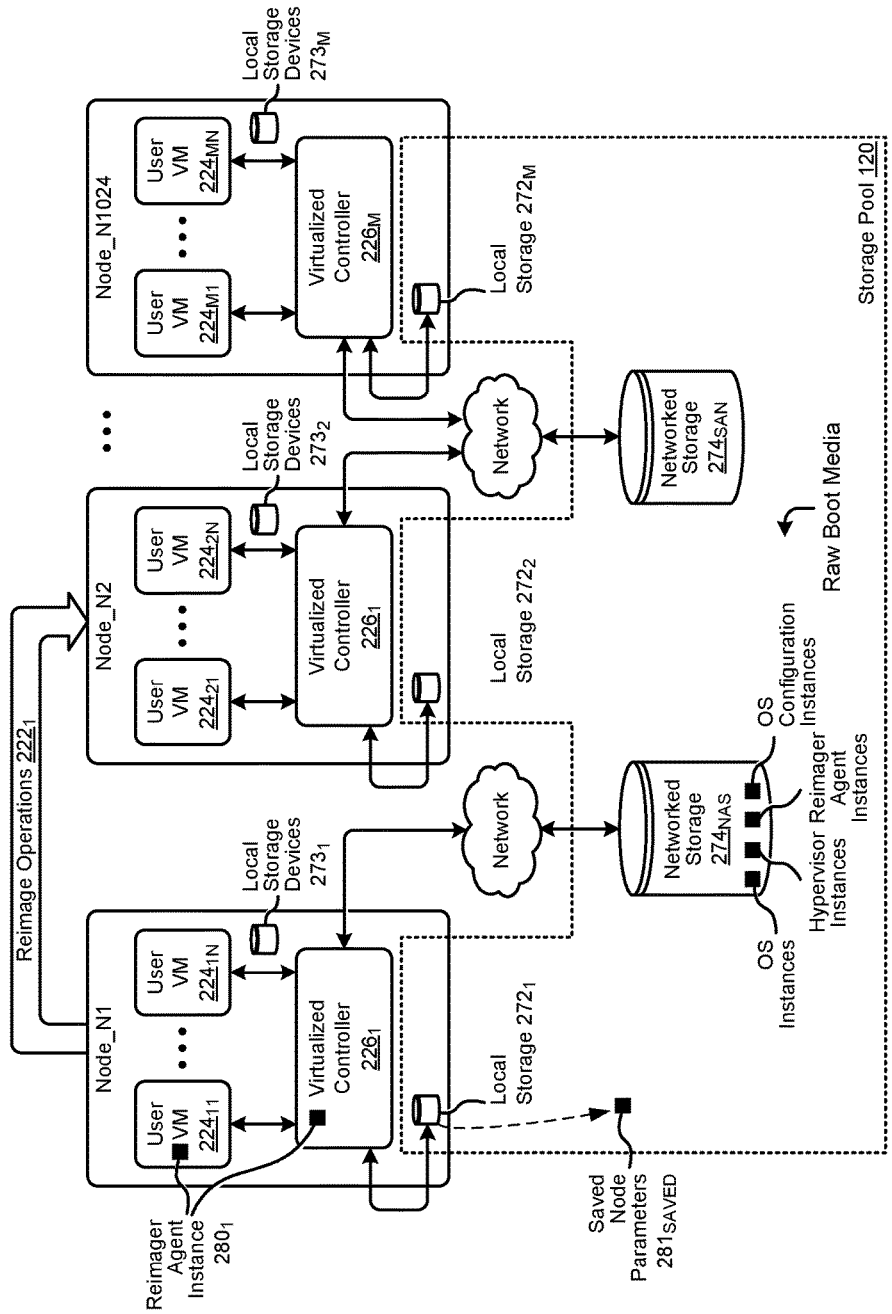
FIG. 2A, FIG. 2B, and FIG. 2C depict system diagrams showing a node-by-node rolling installation succession in a multi-node computing cluster to implement autonomous reimaging of nodes, according to an embodiment.
Figure 2B:
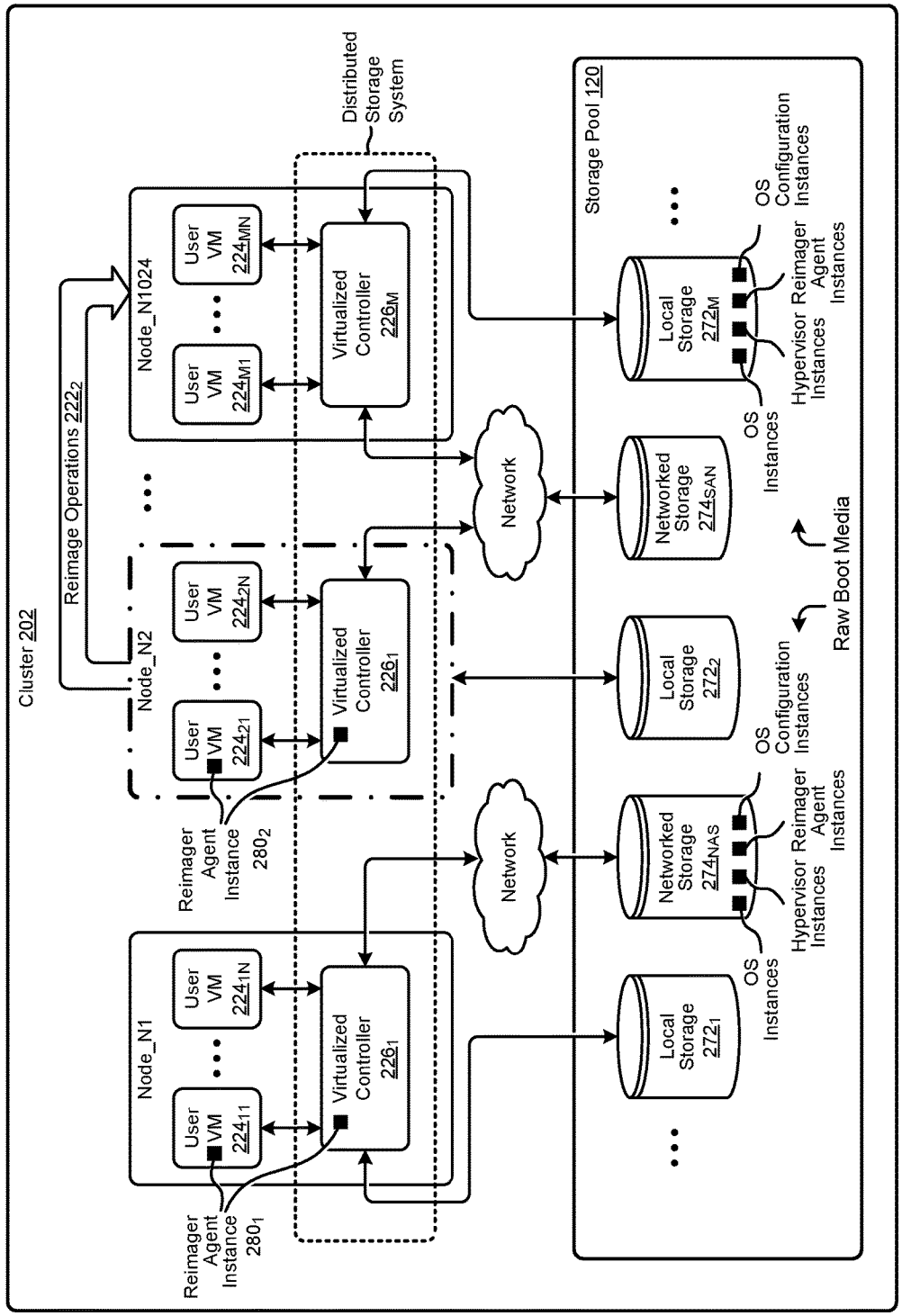
Figure 2C:
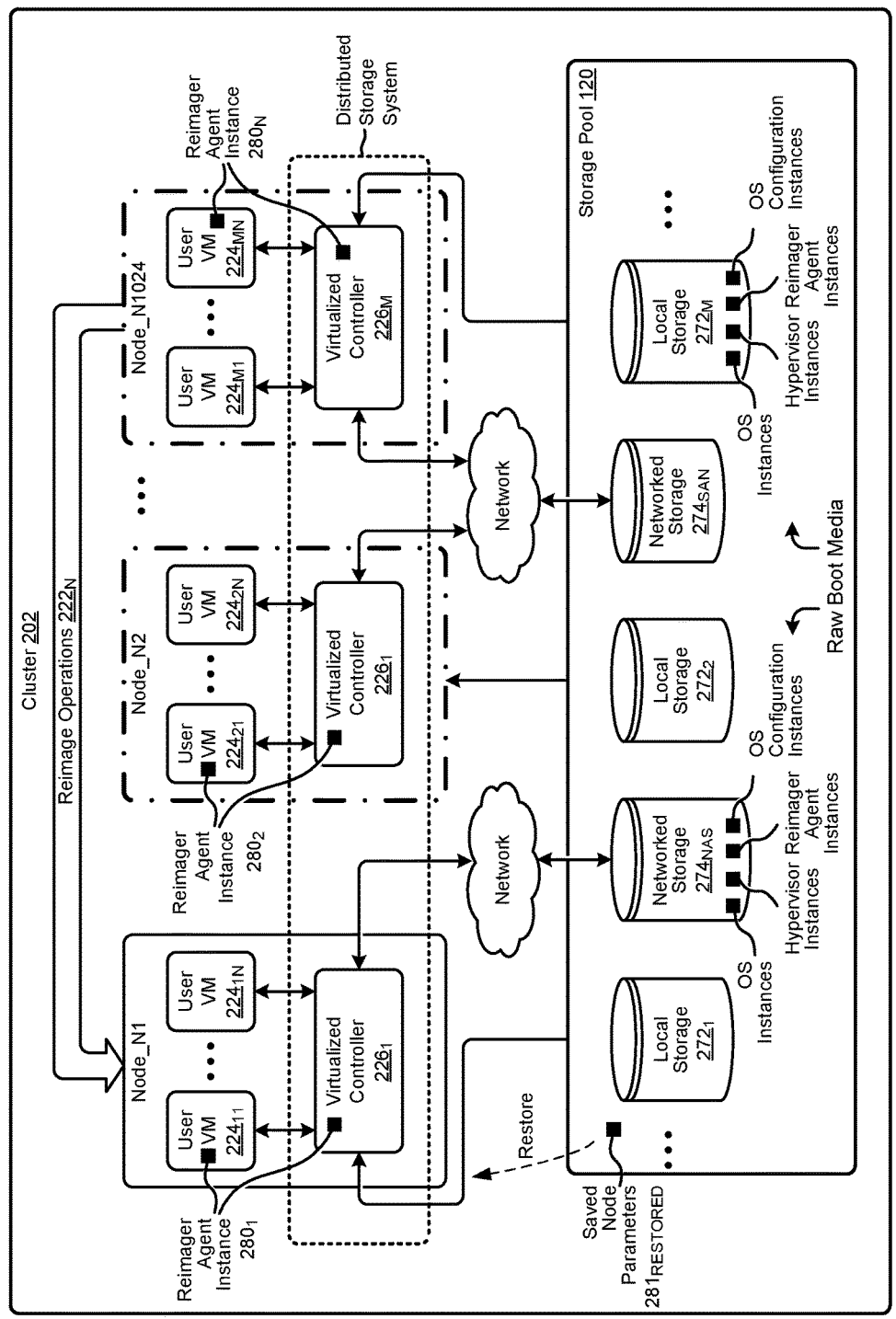

FIG. 2A, FIG. 2B, and FIG. 2C depict system diagrams showing a node-by-node rolling installation succession in a multi-node computing cluster to implement autonomous reimaging of nodes. As an option, one or more variations of node-by-node rolling installation succession in a multi-node computing cluster or any aspect thereof may be implemented in the context of the architecture and functionality of the embodiments described herein. The node-by-node rolling installation succession in a multi-node computing cluster or any aspect thereof may be implemented in any environment.

The cluster 202 comprises a plurality of nodes (e.g., Node_N1, Node_N2 and Node_1024). Any node can communicate with any other node, and any node can access the storage pool 120. Moreover, any node can use a virtualized controller to facilitate access with storage pool 120 so as to retrieve OS instances, and/or hypervisor instances, and/or reimager agent instances, and/or OS configuration agents and/or parameters. Any node may comprise multiple local storage devices, some of which local storage devices or areas might be configured into the storage pool 120 (e.g., local storage $272_k$, local storage $272_2$, local storage $272_M$, etc.), and some of which node-local storage is not configured into the storage pool. (e.g., local storage devices $2'73_1$, local storage devices $273_2$, local storage devices $273_M$, etc.). Either or both portions of node-local storage can be used to hold OS instances, and/or hypervisor instances, and/or reimager agent instances, and/or OS configuration agents and/or parameters. As such, boot media of any sort can be stored in a node-local manner and/or in the storage pool.

As used herein, and as shown, a storage pool 120 comprises both networked storage (e.g., networked storage 274NAS, networked storage 274SAN) as well as local storage (e.g., local storage $272_1$, local storage $272_2$, local storage $272_M$, etc.). As shown, storage IO is routed through the virtualized controller of a particular node. As such, the virtualized controllers can manipulate stored data and storage operations so as to virtualize characteristics of the storage pool. The local storage associated with each node can be physically co-located with node hardware using motherboard-mounted storage or the local storage associated with each node can be physically co-located with node hardware using a storage IO protocol to form a local-attached storage array (e.g., serial attached storage, SAS, SCSI, etc.).

Reimager Instances and Sequences

A node can host a reimager instance in any known form (e.g., as a function within a virtual controller, as a function within a user virtual machine, as a standalone reimager or as a containerized reimager). As depicted in the sequence of FIG. 2A, FIG. 2B and FIG. 2C, a first node (e.g., Node_N1) initiates reimage operations $222_1$, which operations serves to reimage a next node (e.g., Node_N2). In some cases, and as shown, a reimaging operation brings up a reimaged node with new operating system software, possibly also including hypervisor software as well as a reimaging agent instance that runs on the reimaged operating system or over the hypervisor of the reimaged node. At any point in time, a set of node characteristics can be saved for later restoration (e.g., after the first node that initiates reimage operations has itself been reimaged). As shown, the node characteristics can be saved as node parameters $281_{SAVED}$ that are saved in any storage location in the storage pool 120. In many cases the node parameters $281_{SAVED}$ are saved to a networked storage location. In other cases the node parameters $281_{SAVED}$ are saved to a local storage location for retrieval during the reimaging process.

FIG. 2B depicts the sequence after Node_N2 has been reimaged. FIG. 2B also graphically depicts the storage pool in a logical representation. Specifically, inasmuch as combinations of node-local storage devices as well as networked storage are subsumed into the storage pool, the shown logical construction of the storage pool 120 as a single resource illustrates the aspect that the sum total of all storage devices subsumed into the storage pool are accessed as a common address space. As shown, all access to/from the storage pool is through a node-specific virtualized controller. Virtualized controllers can perform addressing functions such as providing storage access to requestors via a particular IP address. Various resources in the storage pool can be accessed via a uniform resource identifier (URI) that can be accessed by any number of nodes in the cluster. The resources in turn can access areas of the storage pool using a common address space.

Successive Reimaging Operations

At least inasmuch as Node_N2 has an instance of the reimager agent $280_2$, it can initiate reimaging operations on a further next node (e.g., Node_N1024, as shown).

The boot media (e.g., OS instances, hypervisor instances, etc.) can be stored in networked storage and/or in any areas of local storage devices pertaining to a particular node. Once reimaged, any portions of boot media stored on local storage devices pertaining to a particular node can be manipulated by that node using that node's virtualized controller. More particularly, a newly reimaged node can participate in a node-by-node rolling installation. Any node involved in the node-by-node rolling installation can account for the reimaged state of itself and/or any other nodes in the cluster. In fact, a just-reimaged node can initiate reimaging operations any other node. For example, a reimaging operation to reimage the first node is depicted in the following FIG. 2C.

FIG. 2C depicts the sequence after Node_N1024 has been reimaged. At least inasmuch as Node_N1024 has an instance of the reimager agent $280_N$, it can initiate reimaging operations $222_N$ on the first node (e.g., Node_N1024, as shown).

A node-by-node rolling installation can be performed over any number of nodes in a cluster. In some cases, a node might be running a hypervisor and user virtual machines, and/or jobs, and/or processes, etc. any of which might need to be quiesced and shut down in an orderly fashion. Accordingly, a reimaging agent can be configured to carry-out a messaging protocol between peer reimaging agents so as to exchange parameters, commands and control messages.

Further details regarding general approaches to quiescing are described in U.S. application Ser. No. 15/178,504 titled, "SAVING AND RESTORING STORAGE DEVICES USING APPLICATION CONSISTENT SNAPSHOTS" filed on Jun. 9, 2016, which is hereby incorporated by reference in its entirety.

Figure 3A:
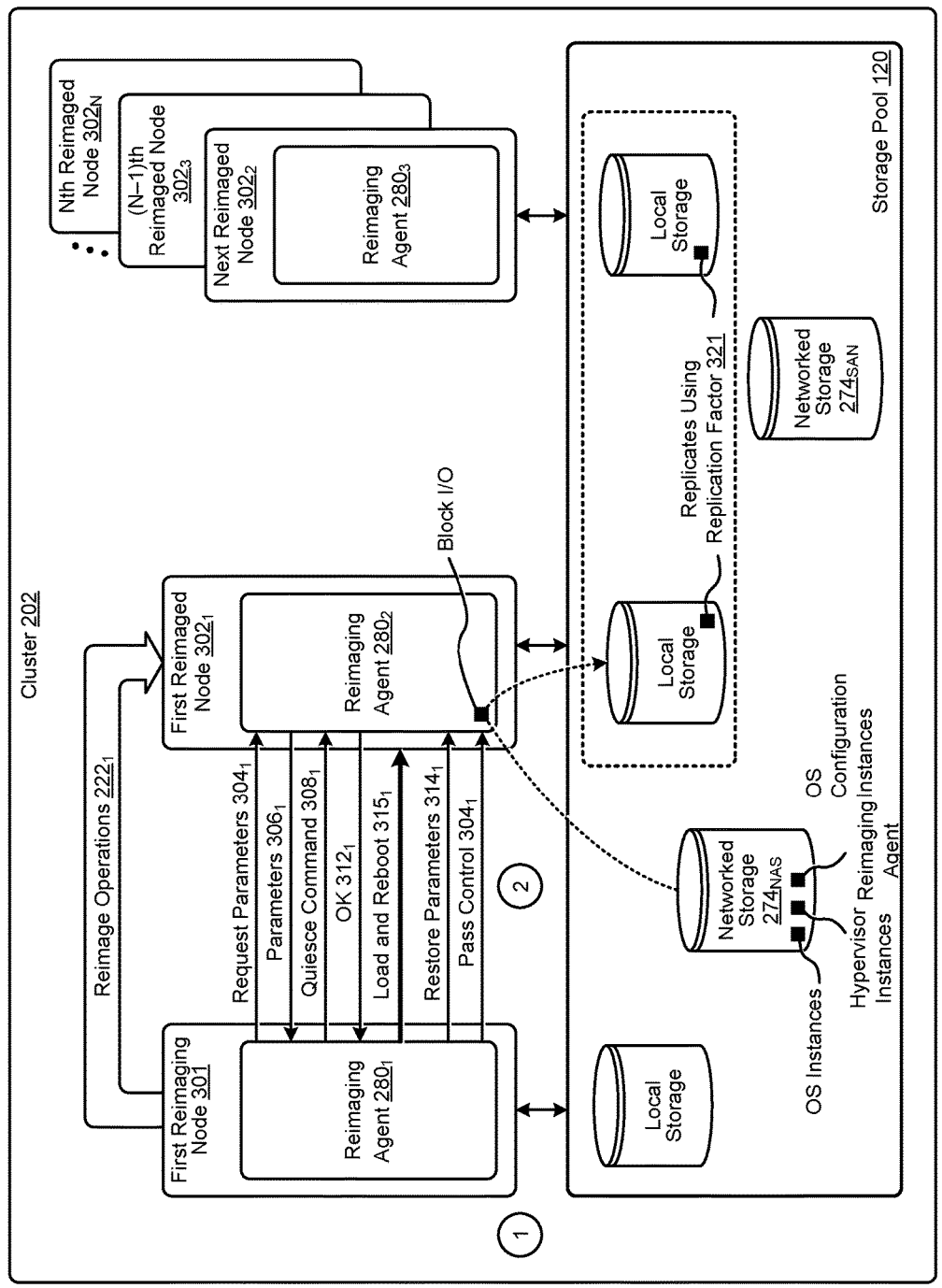
FIG. 3A, and FIG. 3B depict system diagrams showing a node-to-node installation messaging protocol as used to implement autonomous reimaging of nodes, according to an embodiment.
Figure 3B:
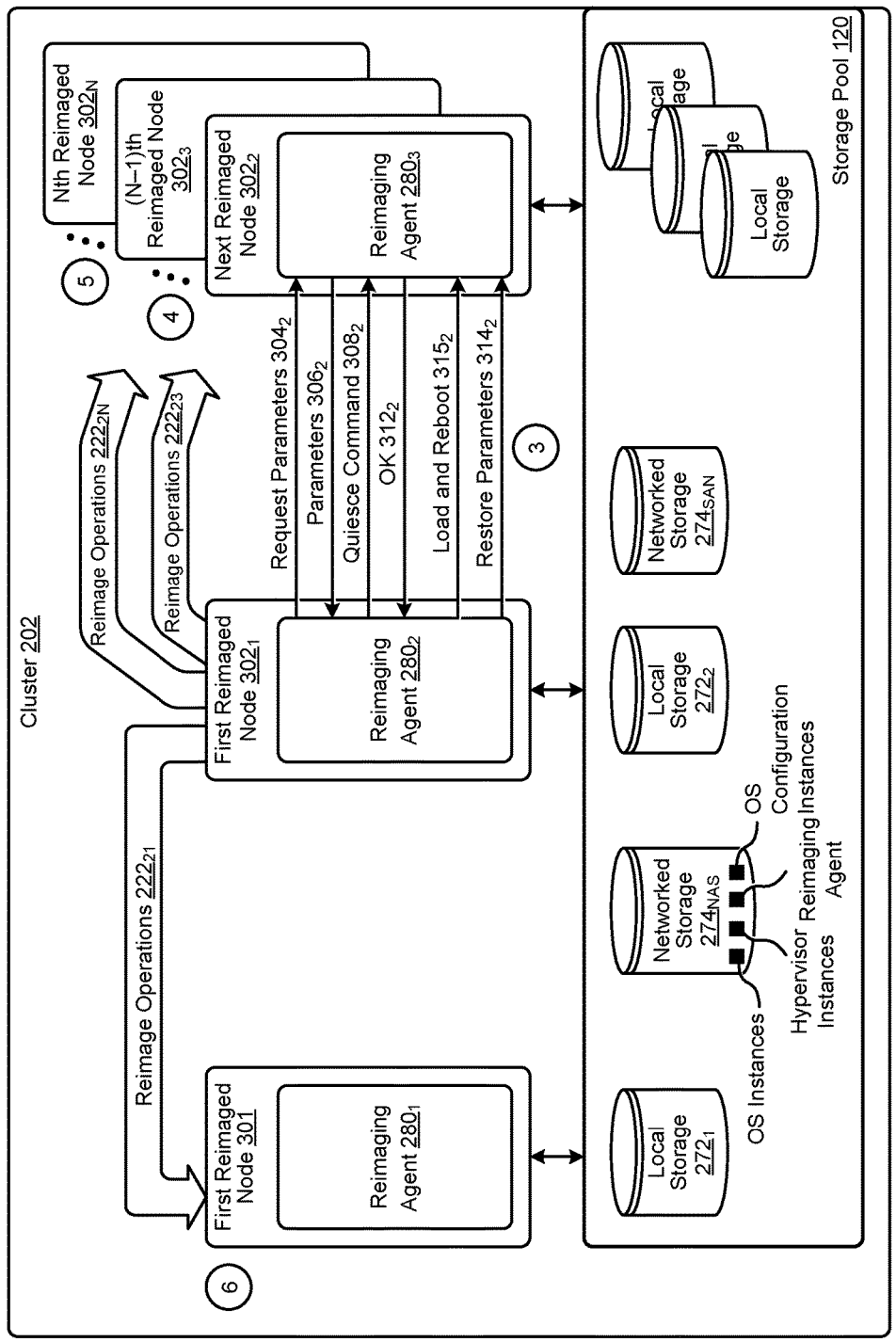

FIG. 3A and FIG. 3B depict system diagrams showing a node-to-node installation messaging protocols as used to implement autonomous reimaging of nodes. As an option, one or more variations of node-to-node installation messaging protocols or any aspect thereof may be implemented in the context of the architecture and functionality of the embodiments described herein. Further, the node-to-node installation messaging protocols or any aspect thereof may be implemented in any environment.

The embodiment shown in FIG. 3A, and FIG. 3B depicts an example reimaging sequence where a first reimaging node 301 interacts with a first reimaged node $302_1$. In many multi-node cluster situations, many nodes are loaded with or are intended to be loaded with a particular configuration of operating system, hypervisor, virtual machines, containers, and so on, including any modules that would support interaction between two nodes during imaging. In such a scenario, many characteristics of the node to be reimaged (e.g. operating parameters) that are used by the node to be reimaged can be saved and restored by a reimaging agent. In such a case, reimaging activities might be initiated by a first reimaging agent (e.g., reimaging agent $280_1$) that communicates with a second reimaging agent (e.g., reimaging agent $280_2$) on another node (at step 1). In this and other embodiments, the first reimaging agent can request a set of operating parameters from the node to be reimaged. The first reimaging node 301 can save those operating parameters and restore them (e.g., from saved node parameters $281_{RESTORED}$) after the node to be reimaged has been loaded with a new operating system, hypervisor, virtual machines, and respective configurations.

In the specific example shown, a node-to-node installation messaging protocol can be carried out to implement reimage operations $222_1$. Such a node-to-node installation messaging protocol commences when the first reimaging node 301 requests parameters (message $304_1$). The node to be reimaged responds with a set of parameters (message $306_1$), which are saved by the first reimaging node 301 so as to be restored into the reimaged node (message $314_1$). In some cases, the reimaging agent $280_2$ is configured so as to respond to a quiesce command (message $308_1$). For example, the reimaging agent $280_2$ can respond to a quiesce command by shutting down or signaling the existence of, or plans for upcoming shut down events to any number of virtual machines and/or a hypervisor running on the same node. When the node is deemed to have been quiesced, then reimaging agent $280_2$ can send an OK signal (message $312_1$) to the reimaging agent $280_1$. The reimaging agent $280_1$ then initiates a load and reboot (message 315) of the node to be reimaged. 222. The saved parameters, if any, can be restored to the reimaged node (message $314_1$). The reimaged node can operate using the newly-loaded components. In some cases, the first reimaging node 301 can pass control (message $304_1$) to another node using the node-to-node installation messaging protocol (at step 2). The reimaged node can itself become a reimaging node. During the course of reimaging, various data, parameters, metadata and other materials can be stored in the storage pool 120. In some cases redundancy or other safeguards (e.g., as depicted via replication factor 321) are in force. As such, data stored in one storage area may be replicated in another storage area so as to store data in a fault-tolerant way. In fault-tolerant configurations, in the event that a disk or even a whole node fails or become unavailable, data can be retrieved from other copies of the replicated data. The replication factor is a configurable parameter. To guard against an occurrence that two or more nodes might fail at the same time, the replication factor can be increased accordingly.

Further details regarding general approaches to system availability using replication are described in U.S. application Ser. No. 15/230,147 titled, "IMPLEMENTING AVAILABILITY DOMAIN AWARE REPLICATION POLICIES" filed on Aug. 5, 2016, which is hereby incorporated by reference in its entirety.

Parameters of any sort can be saved to network storage devices in the networked storage $274_{NAS}$, and/or networked storage $274_{SAN}$. In some cases virtual disk metadata and its contents or portions thereof (e.g., cached data) can be stored in a local storage device that is attached to a particular node. For example, and as shown, a first instance of local storage $272_1$ is attached to a first node, and a second instance of local storage $272_2$ is attached to a second node, and so on. In such a scenario, during reimaging, data (e.g., operating system image blocks) is moved from a networked storage device to one or more node-local storage areas.

FIG. 3B depicts node-to-node installation messaging that can be carried out to implement multiple reimaging operations (e.g., reimage operations $222_{21}$, reimage operations $222_{23}$, reimage operations $222_{2N}$ etc.). More specifically, and as shown, the first reimaged node $302_1$ requests parameters from another node to be reimaged (message $304_2$). The node to be reimaged responds with a set of parameters (message $306_2$), which are saved by the first reimaged node so as to be restored into the soon-to-be reimaged node (message $314_2$). In some cases, the reimaging agent $280_3$ of another node is configured so as to respond to a quiesce command (message $308_2$). When the node to be reimaged is deemed to have been quiesced, then reimaging agent $280_3$ can send an OK signal (message $312_2$) to the reimaging agent $280_2$. The reimaging agent $280_2$ then initiates a load and reboot of the node to be reimaged (at step 3). The saved parameters, if any, can be restored to the reimaged node (message $314_2$).

Any instance of a reimaging agent can include or access data from the storage pool, which data might comprise rules for managing successive reimaging of nodes on a cluster. Some regimes are more aggressive (e.g., more nodes reimaged concurrently) and some regimes are more conservative (e.g., fewer nodes reimaged concurrently). In some cases a test-then-go technique is used to verify that a reimaged load was successful. Such a test-then-go technique can be employed once or multiple times during reimaging of a cluster. Moreover, a test-then-go technique can be employed when reimaging using a single-level regime, and/or when reimaging using a multi-level regime FIGS. 4A and 4B depicts a two level test-then-go technique as used to implement autonomous reimaging of nodes. As an option, one or more variations of two level test-then-go technique or any aspect thereof may be implemented in the context of the architecture and functionality of the embodiments described herein. The single level test-then-go technique or any aspect thereof may be implemented in any environment.

A test-then-go regime is merely one example of a reimaging regime. A reimaging regime is codified as a set of instructions and data configured to carry out an algorithm (e.g., a reimaging algorithm) so as to conform to a predetermined approach (e.g., order, hierarchy, master-slave relationship, etc.). The codified set of instructions and data can be accessed or included in any forms of a reimaging agent. Agents and some possible reimaging approaches are discussed hereunder.

As shown, a user 401 configures a first node (step 404) and establishes a two level test-then-go reimaging regime. An agent detects the two level test-then-go reimaging regime (step 406). In some cases, metadata stored in the storage pool is used to make a determination of the reimaging regime. Based on the determined reimaging regime, reimaging is initiated on a selected node (step 408). If reimaging of the selected node is deemed to be unsuccessful (decision 410) then a report is generated (step 412) and delivered to the user 401. If the reimaging of the selected node is deemed to be a success, then the flow will commence to hand off to the selected, and now reimaged node (step 416) upon which next nodes are reimaged (step 418).

In some cases a codification of a two level test-then-go reimaging regime indication includes an indication of the plurality of nodes in the cluster to be reimaged. For example, such an indication might be codified as a list of nodes, or a range of nodes, or a node or range of nodes to be excluded from reimaging, or any combination thereof.

The heretofore-described flow of FIG. 4A is depicted schematically in FIG. 4B. Specifically, a first reimaging node 301 corresponding to step 404 is configured, and instructions are invoked so as to cause the first reimaging node to perform reimaging steps over a selected node (e.g., selected node $422_1$). After determination of successful reimaging of the selected node, the first reimaging node sends a hand off command to the selected node. The selected node becomes a master (selected node $422_2$), after which the selected node $422_2$ commences to perform reimaging steps over a level of N nodes comprising a next reimaged node $302_2$, and an (N−1)th reimaged node $302_4$, and continuing to a next reimaged node $302_3$ (at step 4) and on to an Nth reimaged node $302_N$ (at step 5). In some cases the selected node $422_1$ also performs reimaging steps on the first reimaging node 301 (at step 6).

The flow of FIG. 4A can be modified to correspond to a multi-level test-then-go flow. A multi-level test-then-go flow is shown in FIG. 5A.

FIGS. 5A and 5B depicts a multi-level test-then-go technique as used to implement autonomous reimaging of nodes. As an option, one or more variations of multi-level test-then-go technique or any aspect thereof may be implemented in the context of the architecture and functionality of the embodiments described herein. The multi-level test-then-go technique or any aspect thereof may be implemented in any environment.

As shown, a user 401 configures a first node (step 404) and establishes a multi-level test-then-go reimaging regime. An agent detects the multi-level test-then-go reimaging regime (step 502). In some cases, metadata stored in the storage pool is used to make a determination of the reimaging regime. Based on the determined reimaging regime, reimaging is initiated on a selected node (step 408). If reimaging of the selected node is deemed to be unsuccessful (decision 410) then a report is generated (step 412) and delivered to the user 401. If the reimaging of the selected node is deemed to be a success, then the flow will commence to hand off to the selected, and now reimaged node. In some cases a codification of a multi-level test-then-go reimaging regime includes an indication of the number of nodes in a level to be reimaged. For example, such an indication might be codified as a lists of nodes, or ranges of nodes, or a nodes or ranges of nodes to be excluded from reimaging, or any combination thereof.

The heretofore-described flow of FIG. 5A is depicted schematically in FIG. 5B. Specifically, a first reimaging node 301 corresponding to step 404 is configured, and instructions are invoked so as to cause the first reimaging node 301 to perform reimaging steps over a selected node (e.g., selected node $510_1$). After determination of successful reimaging of the selected node, the first reimaging node 301 sends a hand off command to the selected node (step 416). The selected node becomes a master (selected node $510_2$), after which the selected node $510_2$ commences to perform reimaging steps over a level comprising M nodes and further commences to perform reimaging steps over a next level comprising M nodes (step 506). The determination of M can be predetermined and stored in the storage pool. The determination of M can depend from the number N of nodes in the cluster. Levels, however large or small need not be reimaged in sequence. In some cases, each of M nodes in a first level can be assigned to a leadership role so as to reimage M nodes, thus reimaging $M^2$ nodes. In some cases, each of M nodes in a first level can be assigned to a leadership role so as to reimage M nodes in a second level, and each of those M nodes in the second level can reimage M nodes, thus reimaging $M^3$ nodes. Some example variations of M and variations of leadership assignments are given in the following figures.

Figure 6A:
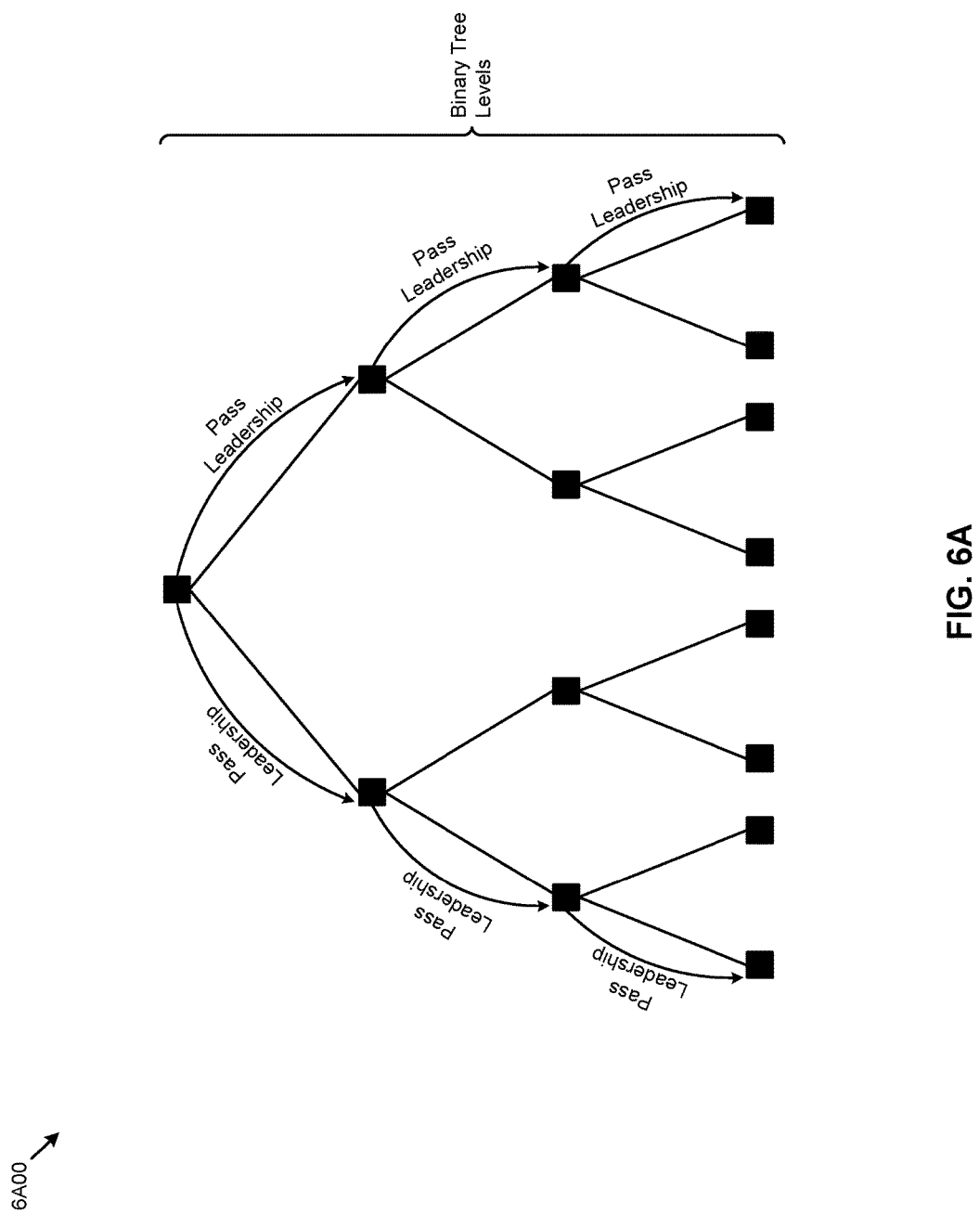
FIG. 6A, FIG. 6B, and FIG. 6C depict example M-nary trees as used in multi-level techniques to implement autonomous reimaging of nodes in a multi-node computing cluster, according to an embodiment.
Figure 6B:
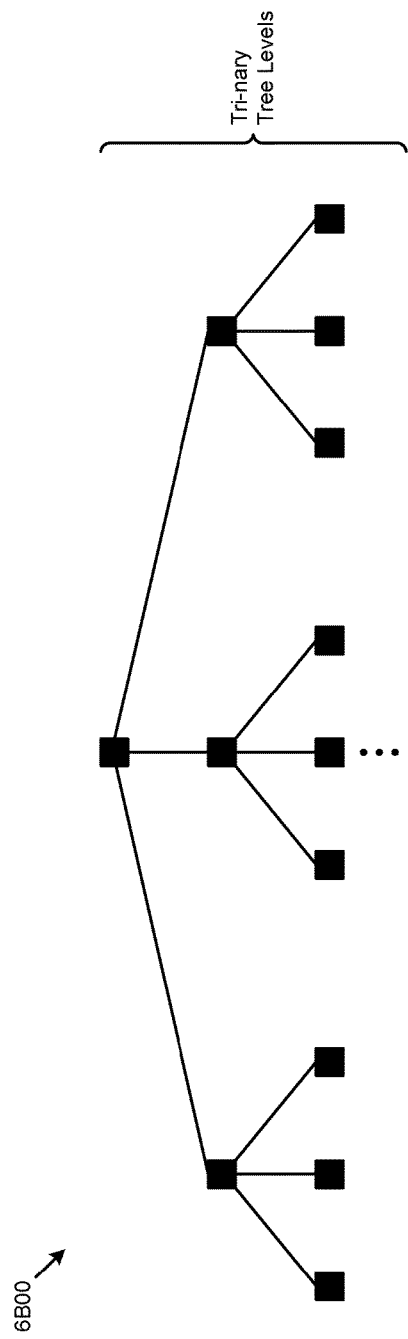
Figure 6C:
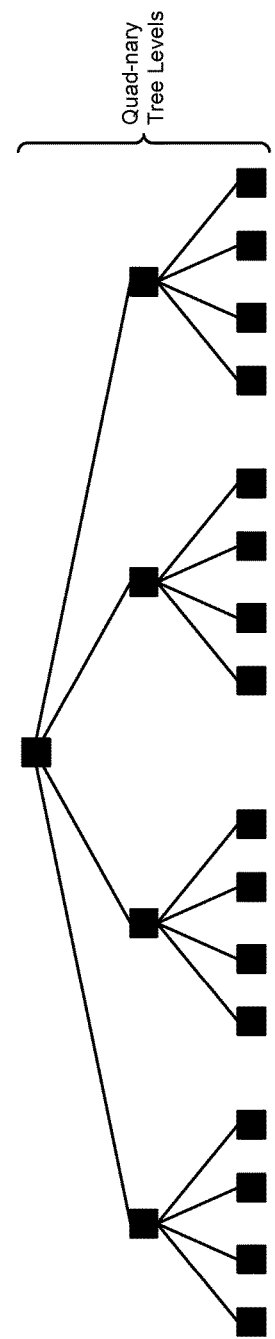

FIG. 6A, FIG. 6B, and FIG. 6C depict example M-nary trees as used in multi-level techniques to implement autonomous reimaging of nodes in a multi-node computing cluster. As an option, one or more variations of M-nary trees or any aspect thereof may be implemented in the context of the architecture and functionality of the embodiments described herein. The M-nary trees or any aspect thereof may be implemented in any environment.

The embodiment shown in FIG. 6A depicts a binary tree 6A00 having three levels. Reimaging can be done in log(M) time by passing leadership from one node in a branch to multiple leaders in a next level. FIG. 6B depicts a tri-nary tree 6B00. FIG. 6C depicts a quad-nary tree 6C00.

ADDITIONAL EMBODIMENTS OF THE DISCLOSURE

Additional Practical Application Examples

Figure 7:
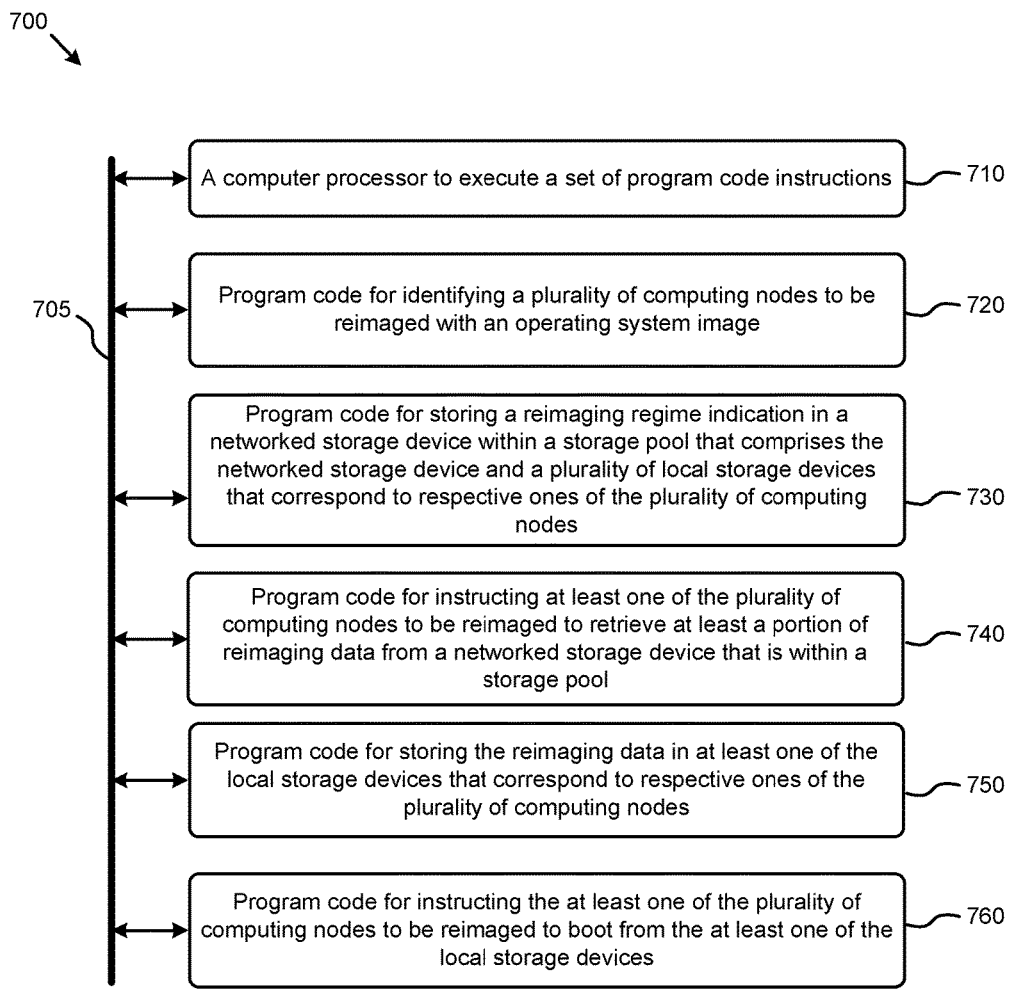
FIG. 7 depicts a system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (module 710) and modules for accessing memory to hold program code instructions to perform: identifying a plurality of computing nodes to be reimaged with an operating system image (module 720); storing a reimaging regime indication in a networked storage device within a storage pool that comprises the networked storage device and a plurality of local storage devices that correspond to respective ones of the plurality of computing nodes (module 730), instructing at least one of the plurality of computing nodes to be reimaged to retrieve at least a portion of reimaging data from a networked storage device that is within a storage pool (module 740); storing the reimaging data in at least one of the local storage devices that correspond to respective ones of the plurality of computing nodes (module 750); and instructing the at least one of the plurality of computing nodes to be reimaged to boot from the at least one of the local storage devices (module 760).

Variations of the foregoing may include more or fewer of the shown modules and variations may perform more or fewer (or different) steps, and/or may use data elements in more, or in fewer (or different) operations.

Some embodiments include variations where the reimaging data comprises software instructions that correspond to a reimaging agent.

Some embodiments include variations where a first instance of the reimaging agent carries out a messaging protocol with a second instance of the reimaging agent.

Some embodiments include variations where the first instance of the reimaging agent is assigned a leadership role.

Some embodiments include variations where the reimaging data comprises block oriented data.

Some embodiments include variations where the block oriented data comprises at least one of, operating system image blocks, or hypervisor instance blocks, or executable container instance blocks.

Some embodiments include variations that comprise instructing at least one of the computing nodes to be reimaged to initiate reimaging operations on two or more other nodes in a sequence.

Some embodiments include variations that comprise instructing at least one of the computing nodes to initiate reimaging operations on multiple nodes in parallel.

System Architecture Overview

Additional System Architecture Examples

Figure 8A:
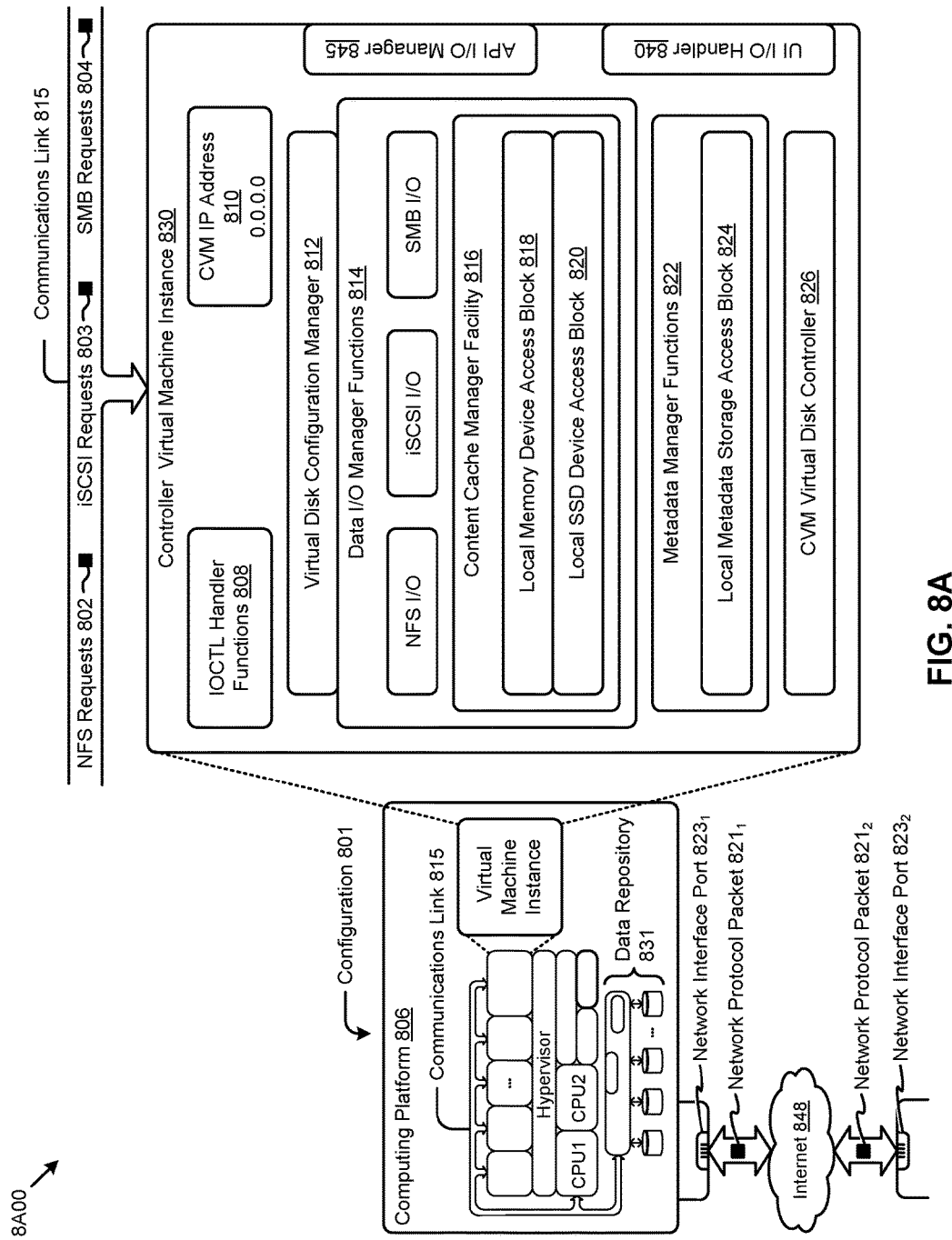
FIG. 8A and FIG. 8B depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The virtual machine architecture comprises a collection of interconnected components suitable for implementing embodiments of the present disclosure and/or for use in the herein-described environments. Moreover, the shown virtual machine architecture 8A00 includes a virtual machine instance in a configuration 801 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL functions 808) that interface to other functions such as data IO manager functions 814 and/or metadata manager functions 822. As shown, the data IO manager functions can include communication with a virtual disk configuration manager 812 and/or can include direct or indirect communication with any of various block IO functions (e.g., NFS IO, iSCSI IO, SMB IO, etc.).

In addition to block IO functions, the configuration 801 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 830 includes a content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831 can be configured using a CVM virtual disk controller 826, which can in turn manage any number or any configuration of virtual disks.

Execution of the sequences of instructions to practice certain embodiments of the disclosure are performed by a one or more instances of a software instruction processor, or processing element such as a data processor, or such as a central processing unit (e.g., CPU1, CPU2). According to certain embodiments of the disclosure, two or more instances of a configuration 801 can be coupled by a communications link 815 (e.g., backplane, LAN, PTSN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). The configuration 801 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code) communicated through Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments of a module include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to autonomous reimaging of nodes in a multi-node computing cluster. In some embodiments, a module may include one or more state machines and/or combinational logic used to implement or facilitate the operational and/or performance characteristics pertaining to autonomous reimaging of nodes in a multi-node computing cluster.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of autonomous reimaging of nodes in a multi-node computing cluster). Such files or records can be brought into and/or stored in volatile or non-volatile memory.

Figure 8B:
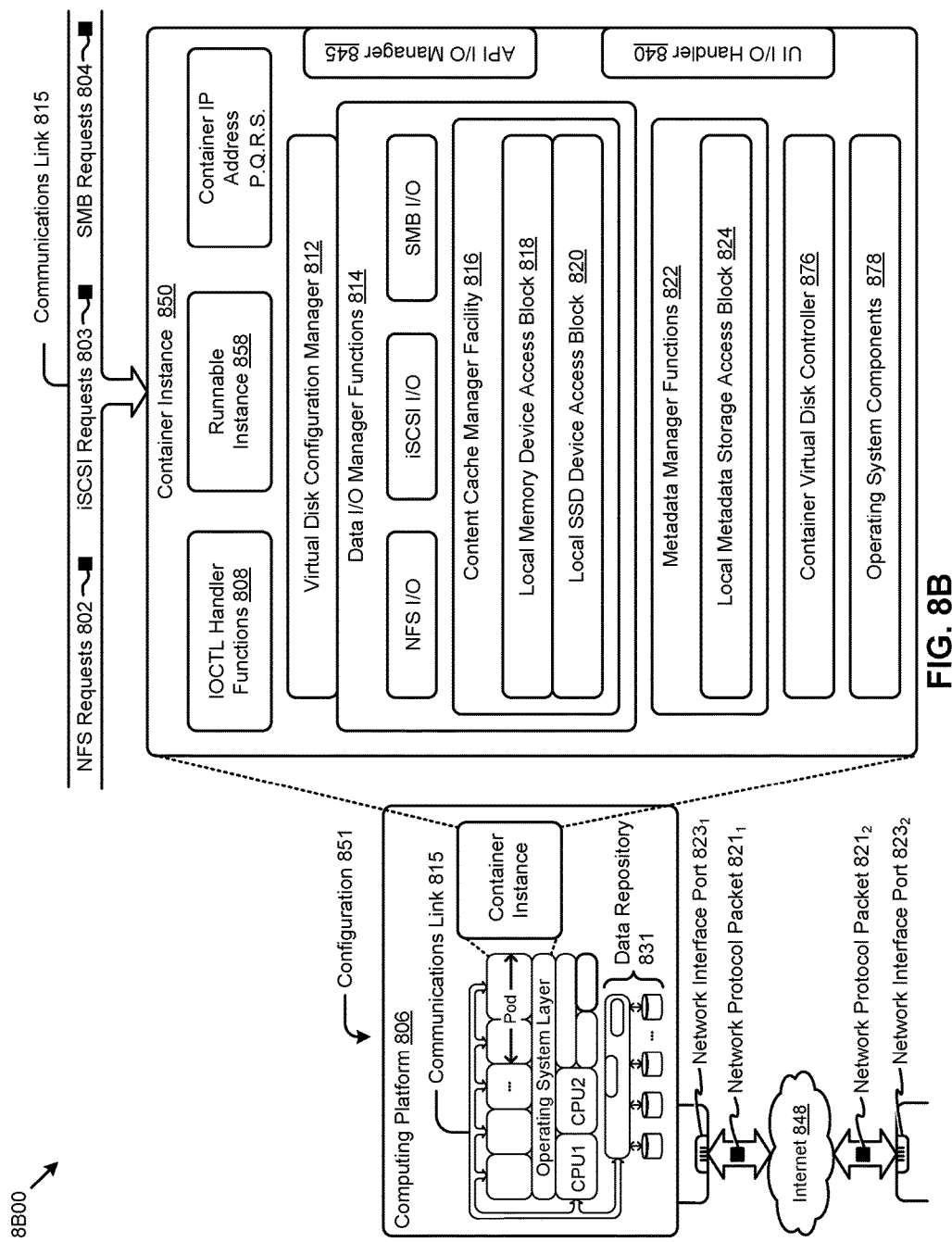

FIG. 8B depicts a virtualized controller implemented by a containerized architecture 8B00. The containerized architecture comprises a collection of interconnected components suitable for implementing embodiments of the present disclosure and/or for use in the herein-described environments. Moreover, the shown containerized architecture 8B00 includes a container instance in a configuration 851 that is further described as pertaining to the container instance 850. The configuration 851 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 850). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls -a", etc.). The container might optionally include operating system components 878, however such a separate set of operating system components need not be provided. As an alternative, a container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   identifying a plurality of nodes in a cluster to be reimaged with an operating system image;
   identifying a selected node from the plurality of nodes of the cluster to initiate reimaging on one or more other nodes of the plurality of nodes, the selected node not having the operating system image already installed; and
   performing a rolling installation of the operating system image on the plurality of nodes of the cluster by reimaging a first node of the plurality of nodes from the selected node, wherein the first node that is reimaged with the operating system image initiates reimaging on at least a second node from among the plurality of nodes, and wherein the selected node is subsequently reimaged by a node within the cluster that has already been reimaged with the operating system image by the rolling installation.

2. The method of claim 1, wherein a reimaging algorithm is stored as a set of executable instructions in a storage pool accessible by the plurality of nodes, the reimaging algorithm comprising reimaging data that comprises instructions that correspond to a reimaging agent.

3. The method of claim 2, wherein a first instance of the reimaging agent carries out a messaging protocol with a second instance of the reimaging agent.

4. The method of claim 3, wherein the first instance of the reimaging agent is assigned a leadership role.

5. The method of claim 2, wherein the reimaging data comprises block oriented data.

6. The method of claim 5, wherein the block oriented data comprises at least one of, operating system image blocks, or hypervisor instance blocks, or executable container instance blocks.

7. The method of claim 1, further comprising instructing at least one of the plurality of nodes reimaged to initiate reimaging operations on two or more other nodes in a sequence.

8. The method of claim 1, further comprising instructing at least one of the plurality of nodes to initiate reimaging operations on multiple nodes in parallel.

9. A computer readable medium, embodied in a non-transitory computer readable medium, the non-transitory computer readable medium having stored thereon a sequence of instructions which, when stored in memory and executed by one or more processors causes the one or more processors to perform a set of acts, the acts comprising:
identifying a plurality of nodes in a cluster to be reimaged with an operating system image;
identifying a selected node from the plurality of nodes of the cluster to initiate reimaging on one or more other nodes of the plurality of nodes, the selected node not having the operating system image already installed; and
performing a rolling installation of the operating system image on the plurality of nodes of the cluster by reimaging a first node of the plurality of nodes from the selected node, wherein the first node that is reimaged with the operating system image initiates reimaging on at least a second node from among the plurality of nodes, and wherein the selected node is subsequently reimaged by a node within the cluster that has already been reimaged with the operating system image by the rolling installation.

10. The computer readable medium of claim 9, wherein a reimaging algorithm is stored as a set of executable instructions in a storage pool accessible by the plurality of nodes, the reimaging algorithm comprising reimaging data that comprises instructions that correspond to a reimaging agent.

11. The computer readable medium of claim 10, wherein a first instance of the reimaging agent carries out a messaging protocol with a second instance of the reimaging agent.

12. The computer readable medium of claim 11, wherein the first instance of the reimaging agent is assigned a leadership role.

13. The computer readable medium of claim 10, wherein the reimaging data comprises block oriented data.

14. The computer readable medium of claim 13, wherein the block oriented data comprises at least one of, operating system image blocks, or hypervisor instance blocks, or executable container instance blocks.

15. The computer readable medium of claim 9, further comprising instructions which, when stored in memory and executed by the one or more processors causes the one or more processors to perform acts of instructing at least one of the plurality of nodes reimaged to initiate reimaging operations on two or more other nodes in a sequence.

16. The computer readable medium of claim 9, further comprising instructions which, when stored in memory and executed by the one or more processors causes the one or more processors to perform acts of instructing at least one of the plurality of nodes to initiate reimaging operations on multiple nodes in parallel.

17. A system comprising:
a storage medium having stored thereon a sequence of instructions; and
one or more processors that execute the instructions to cause the one or more processors to perform a set of acts, the acts comprising,
identifying a plurality of nodes in a cluster to be reimaged with an operating system image;
identifying a node from the plurality of nodes of the cluster to initiate reimaging on one or more other nodes of the plurality of nodes, the node not having the operating system image already installed; and
performing a rolling installation of the operating system image on the plurality of nodes of the cluster by reimaging a first node of the plurality of nodes from the node, wherein the first node that is reimaged with the operating system image initiates reimaging on at least a second node from among the plurality of nodes, and wherein the node is subsequently reimaged by another node within the cluster that has already been reimaged with the operating system image by the rolling installation.

18. The system of claim 17, wherein a reimaging algorithm is stored as a set of executable instructions in a storage pool accessible by the plurality of nodes, the reimaging algorithm comprising reimaging data that comprises instructions that correspond to a reimaging agent.

19. The system of claim 18, wherein a first instance of the reimaging agent carries out a messaging protocol with a second instance of the reimaging agent.

20. The system of claim 19, wherein the first instance of the reimaging agent is assigned a leadership role.

* * * * *